United States Patent [19]

Lerner

[11] Patent Number: 5,433,024
[45] Date of Patent: Jul. 18, 1995

[54] EDGE-LIGHTED DISPLAY

[75] Inventor: Richard D. Lerner, Jersey City, N.J.

[73] Assignee: Displayonix Corp., Spring Valley, N.Y.

[21] Appl. No.: 131,117

[22] Filed: Oct. 4, 1993

[51] Int. Cl.⁶ .................................................. G09F 13/18
[52] U.S. Cl. ........................................... 40/546; 362/31; 362/812
[58] Field of Search ...................... 40/546; 362/31, 32, 362/812

[56] References Cited

U.S. PATENT DOCUMENTS

| | | | |
|---|---|---|---|
| 2,297,851 | 10/1942 | Wyss, Jr. | 40/546 |
| 2,564,110 | 8/1951 | Howenstine et al. | 40/546 |
| 2,623,313 | 12/1952 | Fuchs | 40/546 |
| 2,994,148 | 8/1961 | Endleson | 362/31 |
| 3,464,133 | 9/1969 | DePoray | 40/546 |
| 3,497,686 | 2/1970 | Young | 40/546 |
| 3,561,145 | 2/1971 | Shotwell | 40/546 |
| 3,692,997 | 9/1972 | Miller | 362/31 |
| 3,729,626 | 4/1973 | Thurlow | 362/31 |
| 3,737,644 | 6/1973 | Nocek et al. | 40/546 |
| 3,748,769 | 7/1973 | Nolles | 40/546 |
| 3,780,463 | 12/1973 | Aronoff | 40/546 |
| 3,968,584 | 7/1976 | Kingston . | |
| 4,255,873 | 3/1981 | Eberle | 40/546 |
| 4,277,817 | 7/1981 | Hehr | 362/31 |
| 4,435,743 | 3/1984 | Plumly | 362/31 |
| 4,587,755 | 5/1986 | Sunshine | 40/546 |
| 4,751,615 | 6/1988 | Abrams | 362/31 |
| 4,791,745 | 12/1988 | Pohn | 40/546 |
| 4,965,950 | 10/1990 | Yamada | 40/546 |
| 5,050,046 | 9/1991 | Tada | 362/31 |
| 5,150,960 | 9/1992 | Redick | 362/31 |

FOREIGN PATENT DOCUMENTS 771394  10/1934  France ..................... 40/546

*Primary Examiner*—Richard A. Bertsch
*Assistant Examiner*—Howard Richman
*Attorney, Agent, or Firm*—Weingram & Zall

[57] ABSTRACT

A tapered-transparent acrylic plate has advertising or the like applied to front or back surfaces. The thick end of the plate has openings to receive illumination sources. Incandescent sub-miniature lamps are mounted to a circuit board and are closely coupled to the openings in the plate. The lamps and tapered plate provide uniform illumination of the advertising. The tapered plate and circuit board are retained in a plastic channel which is secured to a base. The channel has ventilation means for the cool operation of the display. The display is powered by a remote transformer which operates the lamps at a level below the design voltage of the lamps. Operating lifetime is significantly increased.

5 Claims, 2 Drawing Sheets

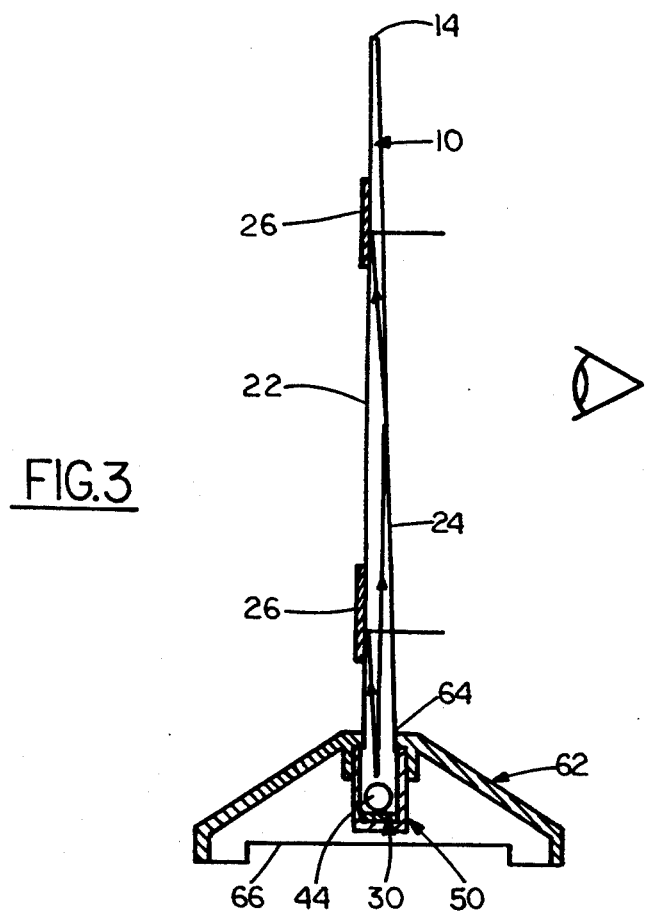
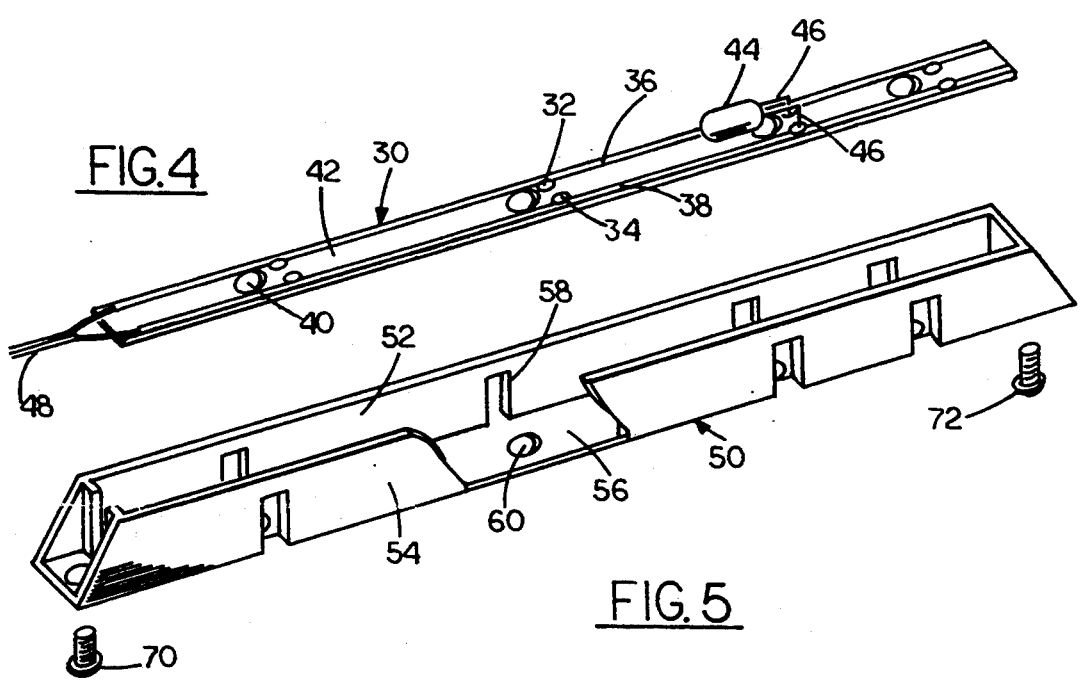

EDGE-LIGHTED DISPLAY

BACKGROUND—FIELD OF THE INVENTION

This invention relates to edge-illuminated displays and signs.

BACKGROUND—DESCRIPTION OF PRIOR ART

Edge-lighted displays and signs have used planar plates with parallel-major surfaces. These plates have their edges abutted to single or plural light sources. The plane surface or surfaces of these plates are treated by engraving, or abraision or decorated by screen printing or painting. Through internal reflection the light entering the edge travels up the plate striking either the engraving or the decoration. The engraving or decoration forms a discontinuity in the surface. This discontinuity causes the light, which would otherwise be internally reflected, to scatter at angles greater than the critical angle. This scattered light emerges from a planar surface making the decoration visible to the viewer.

Planar plates with parallel front and rear surfaces result in uneven illumination of the information displayed on the plate. More light escapes from the decoration nearest the light source rendering copy further away less bright. Also a considerable amount of light escapes out the non-illuminated edges.

Various techniques have been used to improve the performance of parallel-surface plates. To retain the light within the display plate, non-illuminated edges are bevelled to form reflecting prisms or are coated with reflective materials. To enhance light distribution continuous diffuse or opaque coatings are applied to rear surfaces of the plate. The display appears as a solid object rather than a clear plate with "floating" copy. These improvements require additional operations which increase cost, affect appearance, and limit marketability.

Tapered light-transmitting plates are used effectively to provide for controlled escape of light. As light modifiers or light pipes they serve to illuminate surfaces external to themselves. In one application they are used to front illuminate dials or gauges; for example aircraft instruments. The viewer looks through the plate to see the lighted surface of the dial. In another application they are used to evenly rear illuminate liquid crystal displays; for example portable computer screens and automotive indicia. The plate directs light through the rear of the display to the viewer.

An animation display apparatus, as disclosed in U.S. Pat. No. 3,464,133 to DePoray(1969), shows a tapered light-transmitting plate with a faceted rear reflecting surface. This arrangement is not suitable for the display of advertising copy as the facets would conflict with the message presented.

An illuminated display, as disclosed in U.S. Pat. No. 3,780,463 to Aronoff(1973), uses a tapered plate in combination with an opaque diffusely-reflective material to display the message. This material is held in intimate contact with the rear of the plate by various means. This is an unduly complicated apparatus. Furthermore it creates the appearance of a solid display. It does not allow for just the presentation of the message on a clear backround.

Fluorescent and incandescent lamps are typically used as the source of illumination. Fluorescent lamps have high light output and are cool in operation. However they add bulk to the otherwise slim display. The thinnest standard fluorescent lamp is considereably thicker than the display plate. A reflector is necessary to utilize the full light output from this diffuse source. The associated mounting hardware and energizing ballast must be accomodated in the display. The ballast is an additional source of heat. Inexpensive ballasts typically found in advertising displays emit an annoying hum from line frequency induced vibration. Fluorescent lamps experience darkening near their ends after an initial period of use. This results in uneveness in the luminance of the plate. These factors increase cost, weight, size and limit marketability.

Incandescent lamps are used as single sources such as long tubular lamps or as multiple sources such as sub-miniature lamps. Tubular lamps are inexpensive and can be powered from 120 volts AC. However they have short lifetime and generate considerable heat. Like fluorescent lamps they are bulky and require a reflector for efficient light utilization. The addition of ventilation holes allows light too leak out to the viewer and makes the display less attractive. Fluorescent and tubular lamps are discrete linear light sources of pre-determined length. The display plate must be flat in design and equal in length to that of available lamps. These lamps are powered at 120 volts AC. They require suitable enclosures to protect the user from electrical hazards. These factors increase cost and limit design flexibility.

Incandescent sub-miniature lamps have been used to edge light parallel-plate devices. A typical application is exit signs where the lamps long lifetime at reduced voltage is exploited. Sub-miniature lamps operated at low voltage have small filaments and close-fitting glass bulb envelopes. The lamps can be contained within the plate profile. This allows optimally close coupling of the lamps with the display plate. Close coupling, however, has attendant heat. Unless the heat is dissipated by absortion in the surrounding parts or by other means, the glass bulb temperature will rise. This results in unacceptable thermal stress both on the glass and adjacent parts. The surrounding parts are made from plastic for economy. The increased heat would require high temperature plastic resins at increased cost. The glass bulb temperature must be kept within specified limits to avoid shortening lamp lifetime.

OBJECTS AND ADVANTAGES

Accordingly, several objects and advantages of my invention are:
(a) to provide generally consistent and uniform illumination of a display;
(b) to provide an illuminated display which is simple to manufacture;
(c) to provide a lightweight, slim, and low-cost illuminated display;
(d) to provide a cool-operating illuminated display;
(e) to provide an illuminated display quiet in operation;
(f) to provide a long-lifetime illuminated display;
(g) to provide an electrically-safe illuminated display;
(h) to provide an illuminated display which is readily adapted to displaying messages of varying lengths; and
(i) to provide an illuminated display with copy rendered on a clear backround.

Further objects and advantages of my invention will become apparent from a consideration of the drawings and ensuing description.

DRAWING FIGURES

FIG. 3 is an enlarged cross-sectional view of FIG. 2 taken along lines 3—3

FIG. 4 is a perspective view of a printed-circuit board

FIG. 5 is a perspective view of a joining channel with a portion removed

Figure 1:
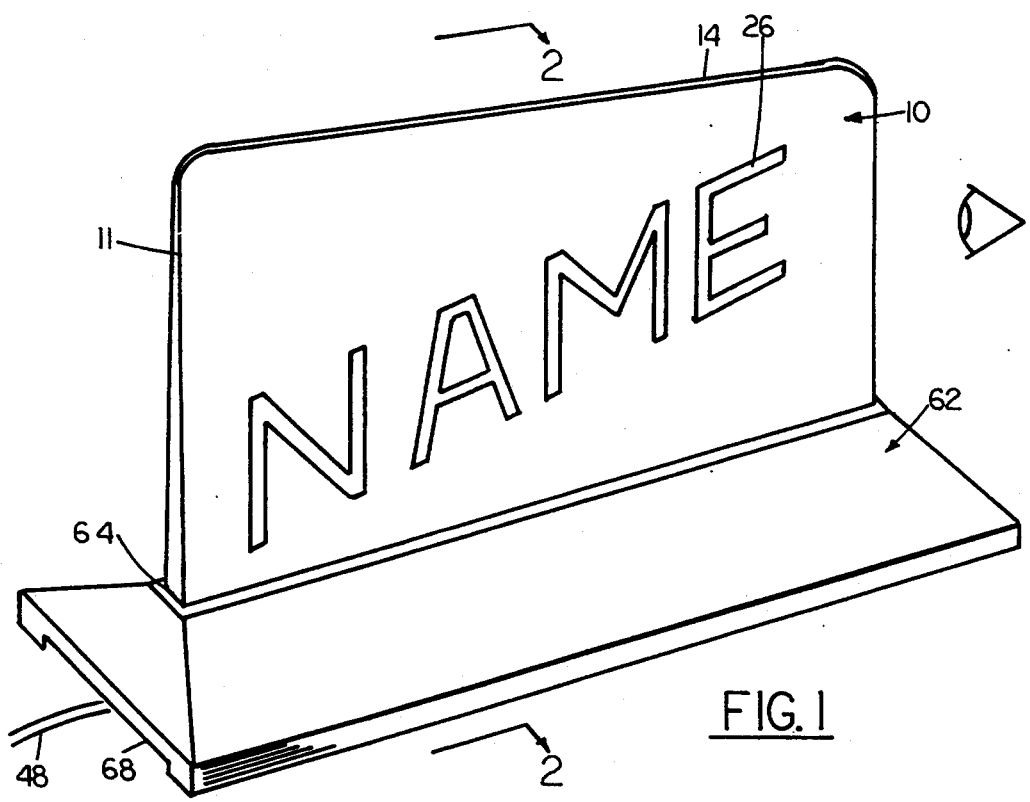
FIG. 1 is a perspective view of an illuminated display

| Reference Numerals In Drawings | | | |
|---|---|---|---|
| 10 | plate | 11, 13 | plate side wall |
| 12 | thick end of plate | | |
| 14 | thin end of plate | 16 | plate slot |
| 18 | slot wall | 20 | recess |
| 22 | plate rear surface | 24 | plate front surface |
| 26 | copy | 30 | printed-circuit board |
| 32, 34 | circuit-board aperture | 36, 38 | circuit-board lead |
| 40 | circuit-board vent hole | 42 | circuit-board coating |
| 44 | lamp | 46 | lamp leads |
| 48 | power cord | 50 | joining channel |
| 52, 54 | channel side wall | 56 | channel bottom |
| 58 | channel-vent slot | 60 | channel-vent hole |
| 62 | mounting base | 64 | base slot |
| 66, 68 | base notch | 70, 72 | screw |
| 74, 76 | screw boss | | |

DESCRIPTION —FIGS. 1 to 5

A typical embodiment of the display of the present invention is illustrated in FIGS. 1 to 5. The display has a tapered or wedge-shaped body or plate 10 of acrylic or other transparent light-transmitting material. Plate 10 may conveniently be shaped as a rectangle with opposite side walls 11 and 13. In this embodiment the rectangle is about 200 mm in length and 130 mm in height. The tapered plate 10 may vary in thickness from the thickest point at one end 12 of about 6 mm and a thickness at its thin end 14 of about 1.5 mm forming an included angle of about 2 degrees at thin end.

The tapered plate 10 is provided at thickest end 12 with a slot or opening 16 adapted to receive as a source of illumination a lamp 44. A wall 18 of the slot 16 is curved so that the wall is equidistant from lamp 44. A recess 20 is provided at the point where wall 18 meets end of plate 12. Recess 20 is shaped similarly to lamp leads 48. A rear-planar surface 22 or a front-planar surface 24 of plate 10 is disposed to receive copy, information or characters 28. Copy 28 may be applied by screen printing or other means of decoration. Front surface 24 of plate 10 is taken as the surface closest to the viewer.

Referring to FIG. 4, a printed-circuit board 30 is provided for rigidly supporting lamp 44 and securing a power cord 48. Lamp receiving apertures 32 and 34 are formed through a pair of circuit-board leads 36 and 38. Apertures 32 and 34 are located so as to position lamp 44 centrally within slot 16 of plate 10. A vent hole or aperture 40 in circuit board 30 is positioned under rear of lamp 44. The surface of circuit board 30 is coated with a white pigment 42.

A retaining or joining channel 50 is shown in FIG. 5. Joining channel 50 is preferably of opaque white plastic. Channel 60 is generally of U-shaped cross section and sized to accomodate thick end 12 of plate 10. Channel 50 consists of side walls 52 and 54 and bottom 56. Bottom and side walls of channel form a compartment for circuit board 30. Joining channel 50 is provided with vent slots 58 in channel side walls 52 and 54 and vent hole or aperture 60 in channel bottom 156. Slot 58 and hole 60 are located so as to be opposite rear of lamp 44 after lamp is mounted to circuit board 30 and circuit board is inserted into channel 50. When circuit board 30 is inserted into channel 50, aperture 40 in circuit board is co-axial with hole 60 in channel. A clear passage is formed through the combination of circuit board 30 and channel 50.

Figure 2:
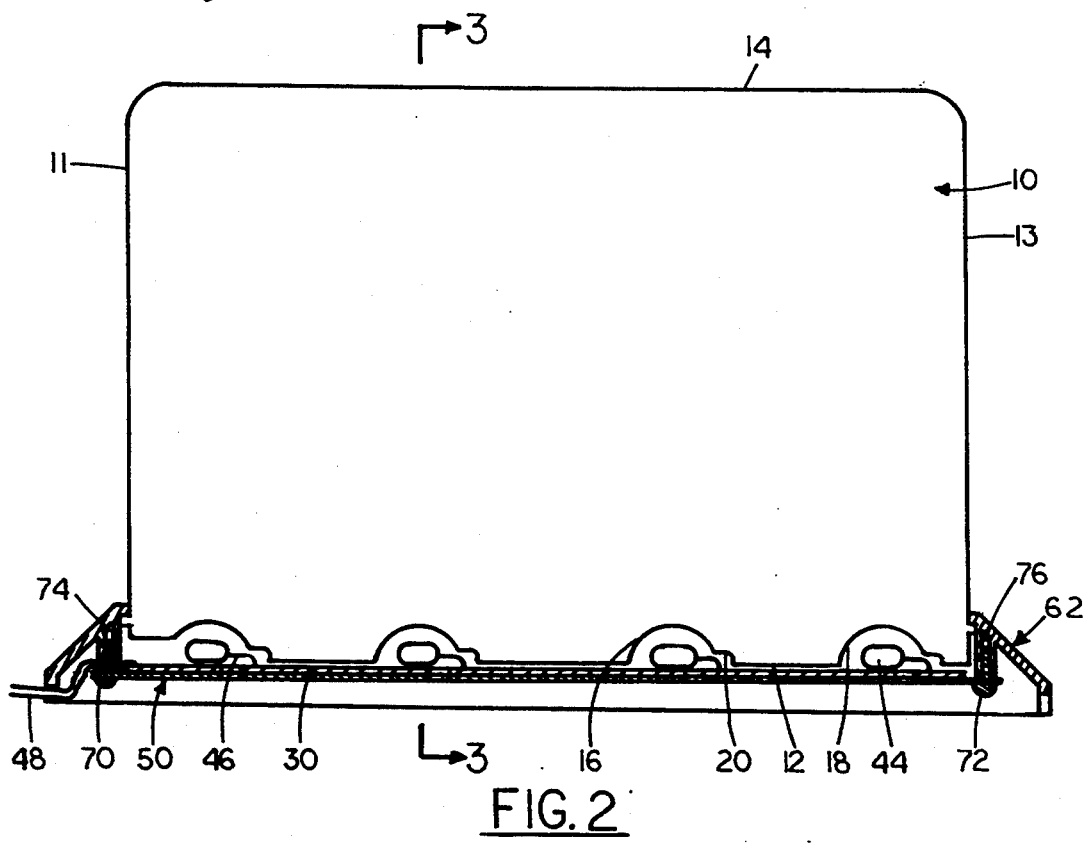
FIG. 2 is a front-elevation section of FIG. 1 taken along lines 2—2

Referring to FIGS. 1,2 and 3, mounting base 62 has an elongated slot 64 to receive plate 10. Notches 66 and 68 are located in either end of base 62. Power cord 48 exits base 62 through notch 68. Base 62 may be of any opaque material such as plastic or metal.

The display is assembled by inserting circuit board 30 with attached lamps 44 and cord 48 into channel bottom 56 to form a pre-assembly. Plate end 12 is inserted into the channel and board pre-assembly. The combined channel 50, board 30, and plate 10 unit is mounted to base 62 by sliding plate 10 through slot 64 in base 62. Screws 70 and 72 secure channel 50 to screw bosses 74 and 76 in the base.

OPERATION—FIGS. 1 to 5

To provide an illuminated display with maximum visual impact, minimal size, and low cost it is desirable to combine all elements as efficiently as possible. In this invention the logo or advertising message 26 is applied to a light-transmitting body 10 in the form of a tapered plate. The tapered plate provides for a controlled escape of light to afford a generally consistent and uniform illumination of the copy. A body having parallel-major surfaces would not provide uniform illumination across its surface.

Light entering plate end 12 near the source 44 strikes the widely-spaced sloping surfaces at shallow angles. Some light reflects off lower portion of copy 26 toward the viewer. The balance of the light is transmitted up plate 10. As the plate narrows further from source 44, the internally-reflected light rays impinge copy 26 on the sloping surfaces at progressively steeper angles. Reflected light from copy 26 is transmitted to front-planar surface 24 at angles greater than the critical angle. This allows more light to exit the front surface of the plate further from source 44 than would occur with a parallel-surface plate. The result is more uniform illumination of copy than would occur with a parallel-surface plate. Copy or characters may be applied to rear surface 22 for viewing by reflected light or to front surface 24 for viewing by transmission. The two effects can operate simultaneously to add the appearance of depth to the copy. This is particularly effective as the copy is rendered on a clear medium without the distraction of a backround.

Non-illuminated edges 11 and 13 are not treated to retain light within plate 10 as with parallel-surface plates. The constantly decreasing cross-sectional area of taper plate 10 reduces edge-exit losses significantly. Any light which does escape draws the viewer's attention to the display.

Recesses 20 allow lamp leads 46 to be brought close to plate end 12, thereby positioning filaments of lamps 44 within openings 16. Openings are semi-circular with their center of curvature located at the filament of lamps. The number and spacing of lamps can be varied to suit the length of copy 26.

The small filaments in low-voltage sub-miniature lamps can be considered point sources of light. Positioning the filaments at the center of curvature of openings 16 allows the radial-light rays to impinge walls 18 of openings 16 perpendicularly. This yields optimal coupling of the light sources 44 and the plate 10.

Lamps 44 are mounted to circuit board 30 so as to be parallel to surface of board 30. The surface is coated with white reflective pigment 42. Channel side wails 52 and 54 are opaque white. Channel 50 and coated board 30 cooperate to act as a reflector to direct light into plate opening 16. This is accomplished within the thickness of plate 10, thereby avoiding any increase in size of the display.

Sub-miniature lamps 44 are about T 1½ in size. They are designed to operate at 14 volts and 0.10 amperes. At those design conditions their design lifetime is 10,000 hours. In this embodiment the power is provided from an Underwriters Laboratories Listed Class 2 remote plug-in transformer. The output of the transformer is 12.6 volts AC. Therefore the lamps will operate at a 10% voltage reduction. Operating lifetime is calculated by industry standard formula:

$$(V1/V2)^{12} \times \text{Design Lifetime}$$
Where V1 is: Design Voltage
V2 is: Operating Voltage Or: $(14.0/12.6)^{12} = 3.5 \times 10{,}000 \text{ hrs.} = 35{,}000 \text{ hrs. operating lifetime}$ Burning at about 10 hours per day results in a lifetime of 9+ years. This compares favorably to a T5 fluorescent lamp with a 7500 hour lifetime for a life cyle of 2+ years. Compared to the lifetime of sub-miniature lamps, a fluorescent lamp would have to be replaced 4 times. In practice fluorescent lamps are often not replaced due to cost or difficulty in disassembling and re-assembling a display. The use of incandescent lamps accomplishes two important objects a) lower initial cost and b) increased product lifetime in the marketplace. The result is greater exposure of the advertiser's message.

Sub-miniature lamps operated at low voltage by a Class 2 transformer accomplish additional objectives. The first is electrical safety. A Class 2 transformer is an inherently-limiting power source. Even if the display is abused or the power cord damaged, only low voltage is present. This affords additional market applications. Consumer-oriented decoration can be applied to the illuminated plate. There is particular application for decoration appealing to children. The low voltage aspect of the display confers additional safety for this use. The second objective is quiet operation. The ballast and attendant hum is eliminated from the display. The third objective is a lightweight and slim design. As room for the ballast is not required in the base, the base can have a low profile and overall weight is reduced.

The assembled display allows for air flow and ventilation of the heat generated by the incandescent lamps. There is air flow into and out of base 62 through notches 66 and 68 at either end. Air flows through vent holes 60 and 40 in channel 50 and board 30 respectively, and into the volume created by openings 16. Air in the openings is exchanged with air in the base through channel-vent slots 58. The precise direction of air flow is not known. However, tests have verified a 25 degree celcius temperature reduction when these ventilation means are incorporated.

Channel-vent slots 58 and vent apertures 60 are positioned toward the rear of lamps 44. This allows air flow as previously discussed while not sacrificing light reflectivity from channel walls 52 and 54 or board coating 42. Any light which does leak out is contained within base 62. No light is observed to exit base notches 66 and 68.

With a design variation joining channel 50 could be eliminated. The mounting of plate 10 and assembled board 30 could be accomodated in base 62 without joining channel 50. However, the use of a separate channel has several advantages. Making the channel white results in maximum light reflectivity while allowing the base to be any color, especially black. If the channel were not used and the base could accomodate the plate and board, an additional manufacturing procedure would be required to enhance the reflectivity of dark base material in the vicinity of the lamps. The separate channel allows vent slots 58 and holes 60 to be simply incorporated in the manufacture of channel 50. If similar venting means had to be incorporated in base 62, additional manufacturing operations and expense would be incurred. The use of plastic for channel 50 allows the base to be metal if desired. The plastic channel insulates circuit board 30 from conductive metal surfaces. This allows greater flexibility and marketing opportunities for the display.

The entire display is secured with only two screws affording simple and economical assembly.

SUMMARY, RAMIFICATIONS, AND SCOPE

Accordingly, the reader will see that the illuminated display of this invention provides a unique, durable and effective means of presenting a message or logo in the marketplace.

- it provides uniform illumination of characters
- it provides a display consisting of few parts and is simply manufactured
- it provides a display which is low in cost to produce
- it provides a compact and lightweight display
- it provides a product with long lifetime and is maintenance-free
- it provides noiseless operation
- it provides for safe, cool operation
- it provides a display which is adaptable to messages of varying length
- it provides for the presentation of copy on a clear medium Although the description above contains many specifications, these should not be construed as limiting the scope of the invention, but illustrative of some embodiments of this invention. For example, the display can have other shapes such as circular, trapezoidal, triangular, etc. The display can be curved toward or away from the viewer. The length and height can vary to suit messages of different sizes. The number of lamps and their spacing can be varied to suit message requirements. The display plate can have a greater or lesser angle of taper. The display can incorporate a clock, either digital or analog in the plate or base. It can function as an adults or childrens decorated lamp or night light. It can rest on its base, be mounted on a wall or hung from a ceiling with the addition of suitable hardware. It can operate at other voltages and wattages. It can have colored, flashing, or sequentially lighted lamps.

Thus the scope of the invention should be determined by the appended claims and their legal equivalents, rather than by the examples given.

I claim:

1. A free standing illuminated point-of-purchase display sign comprising:

a free standing base having a slot therein adapted to receive a panel;

a light transmitting panel having a planar panel portion and bottom panel portion, the bottom panel portion extending through the slot in the base and having therein a plurality of recesses for ventilation and dispersing light, the plurality of recesses forming feet on the bottom panel portion;

positioning means on the light transmitting panel to coact with the base to position the light transmitting panel with respect to the base;

a channel;

a strip light source comprising a plurality of light sources disposed in the channel, each of the plurality of light sources in registration with one of the plurality of recesses on the bottom panel portion;

the feet on the bottom panel portion coacting with the strip light source and the channel to position the strip light source with respect to the panel;

positioning means for permitting the free standing base to coact with the channel to provide a seal against leakage of light between the base and the channel; and fastening means for securing the light strip and channel to the base relative to the light transmitting panel to optimize transmission of light from the channel to the panel.

2. A free standing illuminated point-of-purchase display sign comprising:

a free-standing base having a slot therein adapted to receive a panel;

a light transmitting panel having a planar panel portion and a bottom panel portion, the bottom panel portion extending through the slot in the base and having therein a plurality of recesses for ventilation and dispersing light, the plurality of recesses forming feet on the bottom panel portion, the planar panel portion having information thereon to be illuminated for viewing;

fingers extending from the sides of the bottom panel portion adapted to coact with the base to position the light transmitting panel with respect to the base;

a channel having an open top, side walls and a bottom surface;

a strip light source comprising a plurality of light sources connected in a circuit board disposed on the bottom surface of the channel, each of the plurality of light sources in registration with one of the plurality of recesses on the bottom panel portion;

the feet on the bottom panel portion coacting with the strip light source and the bottom surface of the channel to position the strip light source with respect to the panel;

a shoulder in the slot adapted to coact with the side walls of the channel to provide a seal against leakage of light between the base and the top of the channel; and fastening means for securing the light strip and the channel to the base relative to the light transmitting panel to optimize transmission of light from the channel to the panel.

3. A free-standing illuminated point-of-purchase display sign comprising:

a free-standing base having a top surface, side walls and a slot in the top adapted to receive a panel;

a light transmitting panel having a planar panel portion and a bottom panel portion, the bottom panel portion extending through the slot in the base, wherein the bottom panel portion coacts with the base to position the light transmitting panel with respect to the base;

a channel having a plurality of ventilation apertures disposed therein;

a strip light source comprising a plurality of light sources disposed in the channel;

the bottom panel portion coacting with the strip light source and the channel to position the strip light source with respect to the panel;

positioning means for permitting the free standing base to coact with the channel to provide a seal against leakage of light between the base and the channel;

fastening means for securing the light strip and channel to the base relative to the light transmitting panel to optimize transmission of light from the channel to the panel;

wherein the free standing base encloses the strip light and channel to minimize escaping light from the ventilation apertures disposed in the channel and provides for a sufficient volume of air to circulate through the ventilating apertures of the channel to coact with the strip light source.

4. The display sign of claims 1 or 2 wherein the base encloses the strip light and channel to minimize escaping light from the ventilation apertures disposed in the channel and maximize the amount of light being transmitted to the panel.

5. The display sign of claim 1, 2, or 3 wherein the panel comprises opposed planar surfaces tapered from one edge surface on the bottom panel portion of the panel to an opposed edge surface on the planar portion to form a thick elongated edge on the bottom panel portion and a thin edge on the planar panel portion.

* * * * *